(12) United States Patent
Scussolin et al.

(10) Patent No.: US 9,238,704 B2
(45) Date of Patent: Jan. 19, 2016

(54) POLYETHER POLYURETHANES EXHIBITING ENHANCED SLIP RESISTANCE UNDER WET CONDITIONS

(75) Inventors: Silvia Scussolin, Correggio (IT); Andrea Benvenuti, Correggio (IT)

(73) Assignee: Dow Global Technologies LLC, Midland, MI (US)

( * ) Notice: Subject to any disclaimer, the term of this patent is extended or adjusted under 35 U.S.C. 154(b) by 120 days.

(21) Appl. No.: 13/981,464

(22) PCT Filed: Jan. 23, 2012

(86) PCT No.: PCT/EP2012/050963
§ 371 (c)(1),
(2), (4) Date: Jul. 24, 2013

(87) PCT Pub. No.: WO2010/101086
PCT Pub. Date: Aug. 2, 2012

(65) Prior Publication Data
US 2013/0310474 A1    Nov. 21, 2013

(30) Foreign Application Priority Data
Jan. 24, 2011  (IT) .............................. MI2011A0062

(51) Int. Cl.
| C08G 18/32 | (2006.01) |
| C08G 18/12 | (2006.01) |
| C08G 18/40 | (2006.01) |
| C08G 18/48 | (2006.01) |
| C08G 18/65 | (2006.01) |
| C08G 18/66 | (2006.01) |
| C08G 18/67 | (2006.01) |
| C08G 18/76 | (2006.01) |
| C08G 18/79 | (2006.01) |
| C08J 9/14  | (2006.01) |
| C08L 83/00 | (2006.01) |
| C08G 18/72 | (2006.01) |
| C08G 101/00| (2006.01) |

(52) U.S. Cl.
CPC ............ *C08G 18/3203* (2013.01); *C08G 18/12* (2013.01); *C08G 18/4072* (2013.01); *C08G 18/4812* (2013.01); *C08G 18/4841* (2013.01); *C08G 18/6564* (2013.01); *C08G 18/6674* (2013.01); *C08G 18/725* (2013.01); *C08G 18/7657* (2013.01); *C08G 18/797* (2013.01); *C08J 9/14* (2013.01); *C08G 2101/0008* (2013.01); *C08G 2101/0066* (2013.01); *C08G 2410/00* (2013.01); *C08J 2375/08* (2013.01); *C08L 83/00* (2013.01)

(58) Field of Classification Search
CPC ........... C08G 18/4812; C08G 18/6564; C08G 18/6674
USPC ......................................................... 521/174
See application file for complete search history.

(56) References Cited

U.S. PATENT DOCUMENTS

| 4,559,366 A * | 12/1985 | Hostettler ........................ 521/51 |
| 2010/0227939 A1 | 9/2010 | Mohmeyer et al. |
| 2011/0133598 A1* | 6/2011 | Jenninger et al. ............. 310/311 |
| 2011/0263741 A1* | 10/2011 | Tu .................................. 521/156 |

FOREIGN PATENT DOCUMENTS

| EP | 1225199 A1 | 7/2002 |
| WO | 2010/066598 A1 | 6/2010 |
| WO | 2011/084413 A1 | 7/2011 |

OTHER PUBLICATIONS

Arcol® polyether, Bayer MaterialScience, accessed from website on Dec. 26, 2014.*
PCT/EP2012/050963, International Search Report and Written Opinion of the International Searching Authority.
PCT/EP2012/050963, International Preliminary Report on Patentability.

* cited by examiner

*Primary Examiner* — Melissa Rioja

(57) ABSTRACT

A polyurethane foam is prepared by combining a polyether triol with a hydroxyl value of from 25 to 30 and a molecular weight from 5000 to 7000 g/mol; a polyether diol with a hydroxyl value of from 25 to 30 and a molecular weight from 3000 to less than 5000 g/mol; a chain extender mixture including 1,4-butanediol and at least one of monoethylene glycol, hexanediol, neopentyl glycol, and isomers thereof; a copolymer polyether polyol having a styrene acrylonitrile solids content of at least 38 wt % and an average hydroxyl number of at least 23; an isocyanate component; and a blowing agent. It is particularly suitable for shoe sole applications, where it exhibits improvement in slip resistance under wet conditions when compared with some other polyether-polyurethane formulations.

10 Claims, No Drawings

POLYETHER POLYURETHANES EXHIBITING ENHANCED SLIP RESISTANCE UNDER WET CONDITIONS

BACKGROUND

1. Field of Invention

The present invention relates to the field of polyurethane foams. More particularly, it relates to polyurethane foams having improved slip resistance.

2. Background of the Art

It is well known that polyurethane foams may be obtained by the reaction of an isocyanate component with an active hydrogen-containing component, such as, for example, a polyether or polyester polyol, and, optionally, a blowing agent. For processing convenience it is, in certain circumstances, advantageous to use, as the isocyanate component, an isocyanate-terminated prepolymer. Such prepolymer may be prepared by, for example, the reaction of an excess of an aromatic diisocyanate with a relatively low molecular weight diol such as, for example, dipropylene glycol and/or tripropylene glycol. The blowing agent may be an inert physical blowing agent, such as, for example, a chlorofluoro compound, and/or a reactive blowing agent, such as, for example, water. The preparation of polyurethane foams by such procedures is described in, for example, patent publications EP 235,888; EP 175,733; and U.S. Pat. Nos. 3,591,532; 3,901,959; 4,647,596; and 4,757,095.

Current manufacturing trends for polyurethane foams are driven by two dominant factors, namely, cost and environmental concern. Consideration of cost and superior humid ageing performance leads polyurethane foam producers to select polyether polyols over polyester polyols, while consideration of environmental issues leads such producers to select water in preference to certain physical blowing agents. However, use of water as a blowing agent may compromise certain properties, such as low temperature durability, hardness and processability. Some of these problems may be mitigated by using an isocyanate-terminated prepolymer prepared by reaction of an excess of an aromatic diisocyanate with a relatively high molecular weight polyether diol or triol.

One popular use for polyurethanes currently is in the manufacture of shoesoles. In this application polyurethanes offer versatility, processability, comfort and durability. However, some polyurethane formulations, particularly those based on polyethers, do not offer acceptable or desirable levels of slip resistance. This problem is particularly problematic when the surface of the shoe sole will contact "wet" conditions, such as contact surfaces where water, aqueous solutions, grease, and/or oil are present, all of which tend to actually lubricate the contact point(s) which can result in a slip or fall. An acceptable level of slip resistance is needed to reduce or prevent slipping or falling accidents.

In view of this need, objective standards have been developed to measure slip resistance of a polyurethane material in contact with both dry and wet surfaces. It is measured in terms of the coefficient of friction (COF), also known as frictional coefficient or friction coefficient, between the surface of the polyurethane being tested and a given test surface, such as steel or a pressed ceramic floor, under given test conditions, such as in the presence of glycerol or a detergent solution. It is symbolized by the Greek letter $\mu$ and is a dimensionless scalar value which describes the ratio of the force of friction between two bodies and the force pressing them together. Friction is defined as the resistance to motion that occurs whenever one solid body slides over another.

One particular test standard is specified in the SATRA Technology Centre's test protocol TM144 and in the International Organization for Standardization's UNI EN ISO 13287:2006 standard. This European standard specifies a method for testing the slip resistance of conventionally soled safety, protective and occupational footwear, and is not applicable to special purpose footwear containing spikes, metal studs or similar anti-slip devices. It is well-known and generally accepted that a minimum COF value of around 0.30 is necessary to prevent most wearers from slipping during normal walking. For activities that are more dynamic, such as running, higher COF values are strongly recommended.

SUMMARY OF THE INVENTION

In one aspect the present invention provides a foamed polyurethane prepared from a formulation comprising (1) a polyol component including (a) from 1 to 40 weight percent (wt %), based on the polyol component, of a first polyether polyol, having a hydroxyl value from 25 to 30, a nominal functionality of 3, and a molecular weight of from 5000 to 7000 grams per mole (g/mol), the first polyether polyol being prepared from propylene oxide capped with ethylene oxide and having from 70 to 90 wt % primary hydroxyl groups; (b) from 5 to 60 wt %, based on the polyol component, of a second polyether polyol, having a hydroxyl value of from 25 to 30, a nominal functionality of 2, and a molecular weight of from 3000 to less than 5000 g/mol, the second polyether polyol being prepared from propylene oxide capped with ethylene oxide and having from 80 to 98% of primary hydroxyl groups; (c) from 2 to 11 wt %, based on the polyol component, of a chain extender mixture including from 1.2 to 10.2 wt % of butanediol and from 0.8 to 9.8 wt % of at least one of monoethylene glycol, hexanediol, neopentyl glycol, and isomers thereof; and (d) from 20 to 60 wt %, based on the polyol component, of a copolymer polyether polyol having a styrene acrylonitrile solids content of at least 38 wt % and an average hydroxyl number of at least 23; (2) an isocyanate component; and (3) a blowing agent.

In another aspect the invention provides a process for preparing a polyurethane foam comprising reacting under foam-forming conditions (1) a polyol component including (a) from 1 to 40 wt %, based on the polyol component, of a first polyether polyol, having a hydroxyl value from 25 to 30, a nominal functionality of 3, and a molecular weight of from 5000 to 7000 g/mol, the first polyether polyol being prepared from propylene oxide capped with ethylene oxide and having from 70 to 90 wt % primary hydroxyl groups; (b) from 5 to 60 wt %, based on the polyol component, of a second polyether polyol, having a hydroxyl value of from 25 to 30, a nominal functionality of 2, and a molecular weight of from 3000 to less than 5000 g/mol, the second polyether polyol being prepared from propylene oxide capped with ethylene oxide and having from 80 to 98% of primary hydroxyl groups; (c) from 2 to 11 wt %, based on the polyol component, of a chain extender mixture including from 1.2 to 10.2 wt % of butanediol and from 0.8 to 9.8 wt % of at least one of monoethylene glycol, hexanediol, neopentyl glycol, and isomers thereof; and (d) from 20 to 60 wt %, based on the polyol component, of a copolymer polyether polyol having a styrene acrylonitrile solids content of at least 38 wt % and an average hydroxyl number of at least 23; (2) an isocyanate component; and (3) a blowing agent; to form a foamed polyurethane.

In still another aspect the invention provides a polyol component suitable for use in preparing a polyurethane foam, comprising at least (a) from 1 to 40 wt %, based on the polyol component, of a first polyether polyol, having a hydroxyl value from 25 to 30, a nominal functionality of 3, and a molecular weight of from 5000 to 7000 g/mol, the first polyether polyol being prepared from propylene oxide capped with ethylene oxide and having from 70 to 90 wt % primary hydroxyl groups; (b) from 5 to 60 wt %, based on the polyol component, of a second polyether polyol, having a hydroxyl value of from 25 to 30, a nominal functionality of 2, and a molecular weight of from 3000 to less than 5000 g/mol, the second polyether polyol being prepared from propylene oxide capped with ethylene oxide and having from 80 to 98% of primary hydroxyl groups; (c) from 2 to 11 wt %, based on the polyol component, of a chain extender mixture including from 1.2 to 10.2 wt % of butanediol and from 0.8 to 9.8 wt % of at least one of monoethylene glycol, hexanediol, neopentyl glycol, and isomers thereof; and (d) from 20 to 60 wt %, based on the polyol component, of a copolymer polyether polyol having a styrene acrylonitrile solids content of at least 38 wt % and an average hydroxyl number of at least 23.

In yet another aspect the invention provides a foamed polyurethane having a Shore A surface hardness of not greater than 60; a coefficient of friction under dry conditions of greater than 0.70, and under wet conditions of greater than 0.30, as measured according to UNI EN ISO 13287:2006; and a flex fatigue resistance at 23 degrees Celsius (° C.) of greater than 100 kilocycles (kcycles).

DETAILED DESCRIPTION OF THE EMBODIMENTS

The polyurethane foam disclosed herein may be characterized in many embodiments as having a density of from 350 to 1200 grams per liter (g/L), desirably from 500 to 700 g/L, and in certain particularly preferred embodiments from 550 to 650 g/L. It may be further characterized in having a surface hardness (Shore A) not greater than 60, preferably from 42 to 55, and in certain non-limiting embodiments from 45 to 48. It may be still further characterized as having a COF on a pressed ceramic tile floor, as measured according to UNI EN ISO 13287:2006, greater than 0.70 under dry conditions, and greater than 0.30 under wet conditions. Wet conditions, according to that standard, is defined as having a detergent solution containing a mass fraction of 0.5% sodium lauryl sulphate in demineralized water interposed between the pressed ceramic tile floor and the polyurethane sample being tested.

The polyurethane foam may be prepared by reacting, desirably, a urethane-modified polyisocyanate, as the isocyanate component, and a polyol component that comprises at least four constituents. These constituents include a first polyether polyol having a hydroxyl value from 25 to 30, a nominal functionality of 3, and a molecular weight of from 5000 to 7000 g/mol; a second polyether polyol, having a hydroxyl value of from 25 to 30, a nominal functionality of 2, and a molecular weight of from 3000 to less than 5000 g/mol; a chain extender mixture, including butanediol and monoethylene glycol, hexanediol, neopentyl glycol, or an isomer thereof; and a copolymer polyether polyol having a styrene acrylonitrile solids content of at least 38 wt % and an average hydroxyl number of at least 23. These four components react to impart, in certain embodiments, desirable properties in the areas of hardness, density, resistance to slip, particularly under wet conditions, and flex fatigue. Because of this, the formulations and products of the present invention may find particular application in, in non-limiting example, the footwear industry.

The first polyether polyol, a triol, may be selected from any that meet the requirements defined herein above. In addition to hydroxyl value, functionality and molecular weight as already noted hereinabove, such polyether polyol desirably has from 70 to 90 wt % primary hydroxyl groups. In order to accomplish this, the polyether polyol may be prepared from, in non-limiting example, 85 wt % of polymerized propylene oxide (polyoxypropylene), which has been capped with 15 wt % of ethylene oxide. Preparation of such is well-known to those skilled in the art and generally includes polymerization of the propylene oxide using a hydroxyl- or amine-containing initiator, followed by capping with ethylene oxide. Both addition polymerizations are normally carried out in the presence of one or more suitable base catalysts, or in another embodiment, a double metal cyanide (DMC) complex catalyst, in bulk or, alternatively, in solvent or dispersion. The use of a solvent or dispersant may serve to facilitate subsequent removal of the catalyst or residues, if needed, from the final polyol. In proportion, sufficient ethylene oxide is added to convert at least some, and preferably all, of the secondary hydroxyls of the polymerized propylene oxide end-groups to primary hydroxyls. Such reaction, including both the initial polymerization of the propylene oxide and the ethylene oxide end-capping, is desirably conducted under inert conditions, such as nitrogen, argon or helium, and in closed vessels or reactors. Such vessels or reactors should be suitably equipped with heating and cooling means, stirrers, and charging and discharging means. A variety of methodologies is widely known in the art and is also discussed in, for example, U.S. Pat. No. 3,829,505, the entirety of which is incorporated herein by reference.

The second polyether polyol, having a hydroxyl value of from 25 to 30, a nominal functionality of 2, and a molecular weight of from 3000 to less than 5000 g/mol, may be prepared similarly to the first polyether polyol, as described herein above. However, this second polyether polyol may include a higher proportion of ethylene oxide capping, for example, 20 wt %, which may lead to a wt % ratio of propylene oxide to ethylene oxide of 80/20, which helps to achieve the 80 to 98 wt % primary hydroxyl groups. The second polyether polyol also has a lower molecular weight. It, too, is based on propylene oxide, but it is a diol.

The polyol component further includes a chain extender mixture. Without wishing to be bound hereby, it is theorized that this particular combination of chain extenders, in combination with the particular combination of triol and diol, as described hereinabove, and copolymer polyol, as described hereinbelow, is a key to obtaining the surprisingly enhanced performance in wet slip resistance, as well as contributing to a tactile quality that is herein described as a "pleasant soft touch." This chain extender mixture includes 1,4-butanediol and at least one of monoethylene glycol, hexanediol, neopentyl glycol, and isomers thereof. In certain particular embodiments the chain extender mixture consists essentially of or consists of the 1,4-butanediol and the at least one of monoethylene glycol, hexanediol, neopentyl glycol, and isomers thereof, and in more particular embodiments the chain extender mixture consists essentially of or consists of only the 1,4-butanediol and the monoethylene glycol. The 1,4-butanediol may be prepared by, for example, reaction of acetylene with formaldehyde to form 1,4-butynediol in an example of Reppe chemistry, followed by hydrogenation to form 1,4-butanediol, or by any other effective means known to those skilled in the art.

The final required constituent of the polyol component is a copolymer polyol. In general, copolymer polyols may be produced by polymerizing one or more ethylenically unsaturated monomers dissolved or dispersed in a polyol (called the "carrier" or "feedstock polyol") in the presence of a free radical catalyst to form a stable dispersion of polymer particles in the polyol. Preferably the feedstock polyol for this component has an average nominal functionality from 1.5 to 2.7. Preferably the functionality is from 1.8 to 2.2. In one particular embodiment, the feedstock polyol is a diol or a blend of two or more diols. Preferably the feedstock polyol has an average equivalent weight of from 400 to 2,000; more preferably from 450 to 1,500; still more preferably from 500 to 1,400; and most preferably from 750 to 1,250.

Due to the desired reactivity of the copolymer polyol, in one embodiment the feedstock polyol contains one or more polyols with an ethylene oxide end-capping where the ethylene oxide is from 15 to 30 weight percent (wt %) of the feedstock polyol and the total amount of ethylene oxide in the feedstock polyol is not greater than 70 wt %. Preferably the EO content in the end-cap is from 16 to 27 wt %, and more preferably from 17 to 25 wt %, of the feedstock polyol.

In one non-limiting embodiment this copolymer polyol has a solids content of at least 38 wt % of, e.g., styrene acrylonitrile (SAN) polymer, and an average hydroxyl number of at least 20, and more desirably, at least 23. In another embodiment a suitable copolymer polyol is one containing 38 wt % of SAN solids, having an average hydroxyl number of 23, and including as its feedstock polyol a 3000 molecular weight (MW) dipropylene glycol-initiated diol. See also WO 2008/005708, which is incorporated herein by reference in its entirety, for a further discussion of copolymer polyols.

Those skilled in the art will understand that other copolymer polyols falling within the definition of suitable copolymer polyols may be used in the inventive formulations and compositions. It will also be understood that a number of combinations of the two polyether polyols, along with the chain extender mixture and the copolymer polyol, may be employed. For example, in one embodiment the formulation further includes a branched diol or triol having a molecular weight from 60 to 300 g/mol, and a polyoxyalkylene polyol having an average functionality from 2 to 4 and a molecular weight from 2000 to 9000 g/mol. In this case the diol or triol and the polyoxyalkylene polyol may be present in a ratio, based on parts by weight, ranging from 0.01:1 to 0.25:1.

In order to prepare the polyurethane foam it is necessary to react the polyol component with an organic isocyanate component. Suitable polyisocyanates may be aliphatic, cycloaliphatic, araliphatic, or aromatic polyisocyanates, or combinations thereof. Such may include, for example, alkylene diisocyanates, particularly those having from 4 to 12 carbon atoms in the alkylene moiety, such as 1,12-dodecane diisocyanate, 2-ethyltetramethylene 1,4-diisocyanate, 2-methylpentamethylene 1,5-diisocyanate, 2-ethyl-2-butylpentamethylene 1,5-diisocyanate, tetramethylene 1,4-diisocyanate and preferably hexamethylene 1,6-diisocyanate; cycloaliphatic diisocyanates, such as cyclohexane 1,3- and 1,4-diisocyanate and any desired mixture of these isomers, 1-isocyanato-3,3,5-trimethyl-5-isocyanato-methylcyclohexane (isophorone diisocyanate), 2,4- and 2,6-hexahydrotolylene diisocyanate and the corresponding isomer mixtures, 4,4-, 2,2'- and 2,4'-dicyclohexylmethane diisocyanate and the corresponding isomer mixtures, araliphatic diisocyanates, for example, 1,4-xylylene diisocyanate and xylylene diisocyanate isomer mixtures, and preferably aromatic diisocyanates and polyisocyanates, for example, 2,4- and 2,6-tolylene diisocyanate and the corresponding isomer mixtures, 4,4'-, 2,4'- and 2,2'-diphenylmethane diisocyanates, polyphenyl-polymethylene polyisocyanates, mixtures of 4,4'-, 2,4'- and 2,2'-diphenylmethane diisocyanates and polyphenyl-polymethylene polyisocyanates (crude MDI), and mixtures of crude MDI and tolylene diisocyanates. The organic diisocyanates and polyisocyanates may be employed individually or in the form of combinations thereof.

The isocyanates component is, in certain particular embodiments, desirably a prepolymer, that is, a urethane-modified aromatic polyisocyanate such as a prepolymer prepared from 4,4'-diphenylmethane diisocyanate.

The organic polyisocyanates may be prepared by known processes. They are preferably prepared by phosgenation of the corresponding polyamines with formation of polycarbamoyl chlorides, followed by thermolysis of the polycarbamoyl chlorides to produce organic polyisocyanate and hydrogen chloride. Alternatively, they may be prepared by phosgene-free processes, such as, for example, by reacting the corresponding polyamines with urea and alcohol to give polycarbamates, followed by thermolysis of the polycarbamates to produce the polyisocyanate and alcohol.

Where the polyisocyanates are to be modified, groups such as esters, ethers, ureas, biurets, allophanates, uretoneimines, carbodiimides, isocyanurates, uretidiones and/or urethanes may be added thereto. One example product is a urethane-containing organic, preferably aromatic, polyisocyanate containing from 33.6 to 15 wt %, preferably from 31 to 21 wt %, of NCO, based on the total weight. Preparation begins with 4,4'-diphenylmethane diisocyanate, 4,4'- and 2,4'-diphenylmethane diisocyanate mixtures, or crude MDI or 2,4- or 2,6-tolylene diisocyanate, which are then modified by means of reaction with diols, triols dialkylene glycols, trialkylene glycols or polyoxyalkylene glycols having molecular weights of up to 6000 g/mol. Specific examples of di- and polyoxyalkylene glycols, which may be employed individually or as mixtures for this purpose, include diethylene, dipropylene, polyoxyethylene, polyoxypropylene, and polyoxy-propylene-polyoxyethylene glycols, triols and/or tetrols.

NCO-containing prepolymers containing from 25 to 3.5 wt %, preferably from 21 to 14 wt %, of NCO, based on the total weight, may be prepared from the polyether polyols described hereinabove, which have been reacted with 4,4'-diphenylmethane diisocyanate, mixtures of 2,4'- and 4,4'-diphenylmethane diisocyanate, 2,4- and/or 2,6-tolylene diisocyanates, or crude MDI. Furthermore, liquid polyisocyanates containing carbodiimide groups and/or isocyanurate rings and containing from 33.6 to 15 wt %, preferably from 31 to 21 wt %, of NCO, based on the total weight, reacted with, for example, 4,4'-, 2,4'- and/or 2,2'-diphenylmethane diisocyanate and/or 2,4'- and/or 2,6-tolylene diisocyanate, may also be selected.

The modified polyisocyanates may be mixed with one another or with unmodified organic polyisocyanates, such as, for example, 2,4'- or 4,4'-diphenylmethane diisocyanate, crude MDI, and/or 2,4- and/or 2,6-tolylene diisocyanate. In certain embodiments the isocyanate component may be prepared by reacting a monomeric 4,4'-methane-diisocyanate and an isocyanate-reactive component comprising an ethylene oxide-capped diol having a molecular weight of 6000; and a second chain extender including dipropylene glycol, tripropylene glycol, or a mixture thereof; under conditions suitable to form a prepolymer. This prepolymer is then reacted with the polyol component and a blowing agent to make the final polyurethane foam. In particular embodiments, prepolymers having an isocyanate equivalent weight from 180 to 300 may be especially useful.

Organic polyisocyanates which may also be particularly successful may further include mixtures of modified organic polyisocyanates containing urethane groups, having an NCO content of from 33.6 to 15 wt %, in particular those based on tolylene diisocyanate, 4,4'-diphenylmethane diisocyanate, diphenylmethane diisocyanate isomer mixtures or crude MDI, in particular 4,4'-, 2,4'- and 2,2'-diphenylmethane diisocyanate, polyphenyl-polymethylene polyisocyanates, 2,4- and 2,6-tolylene diisocyanate, crude MDI having a diphenylmethane diisocyanate isomer content of from 30 to 80 wt %, preferably from 35 to 45 wt %, and mixtures of at least two of the above-indicated polyisocyanates, for example, crude MDI or mixtures of tolylene diisocyanates and crude MDI.

The formulation may also include at least water, which serves as a chemical blowing agent, and in particular embodiments may also include a second blowing agent which is desirably a physical blowing agent. Among possible selections of a physical blowing agent are alkanes; cycloalkanes; dialkyl ethers; cycloalkylene ethers; fluoroalkanes; and mixtures thereof. Specific non-limiting examples of the above groups may include propane, n-butane, isobutane, n- and iso-pentane and technical-grade pentane mixtures; cyclopentane, cyclobutane, and cyclohexane; dimethyl ether, methyl ethyl ether, methyl butyl ether and diethyl ether; furan; and trifluoromethane, difluoromethane, difluoroethane, tetrafluoroethane and heptafluoropropane. The fluoroalkanes may be particularly desirable because it is currently believed that these compounds break down in the troposphere and, therefore, do not damage the ozone layer. For example, fluorinated blowing agents tradenamed SOLKANE®, available from Solvay Fluorides LLC, may be suitably employed. Hydrofluoroethers, such as those described in, for example, US Patent Publication 20060128821A1, may also be employed.

The proportions of the first and second polyether polyols, the chain extender mixture, and the copolymer polyol may be varied within specified ranges while still facilitating production of a product that may exhibit the improvements of the invention. For example, the first polyether polyol may range from 1 to 40 wt %, based on the weight of the polyol component as a whole, and in certain non-limiting embodiments may range from 10 to 40 wt %, more desirably from 15 to 35 wt %, and still more desirably from 20 to 35 wt %, on the same basis. The second polyether polyol may range from 5 to 60 wt %, and in certain non-limiting embodiments may range from 5 to 40 wt %, on the same basis. The chain extender mixture is included in very minor amount, ranging from 2 to 11 wt %, with the butanediol representing from 1.2 to 10.2 wt %, and the monoethylene glycol, hexanediol, neopentyl glycol, or isomer thereof ranging from 0.8 to 9.8 wt %, all based on the polyol component as a whole, and in certain non-limiting embodiments the butanediol may range from 2 wt % to 5 wt % and the monoethylene glycol, hexanediol, neopentyl glycol, or isomer thereof may range from 1 wt % to 2 wt %, with the total chain extender mixture ranging from 3 wt % to 7 wt %. Finally, the copolymer polyol may range from 20 to 60 wt %, and in certain non-limiting embodiments may range from 25 to 55 wt %, on the same basis.

The total amount of blowing agent(s) will depend on the course of the boiling point curve of the mixture and may be determined experimentally by known methods. Thus, in certain embodiments polyurethane foams having desirable densities may be obtained where the blowing agent is water, in an amount ranging from 0.05 to 0.9 pbw, based on 100 parts of polyol. In certain particular and non-limiting embodiments, the amount may range from 0.1 to 0.5 pbw, and in other non-limiting embodiments may range from 0.15 to 0.45 pbw, on the same basis. Where the blowing agent includes cyclopentane, an amount from 0.5 to 3 pbw, and preferably from 1 to 2.5 pbw, more preferably from 1.5 to 2.0 pbw, based on 100 parts of the polyol formulation, may be suitable, alone or in combination with water. Where a low-boiling compound which is homogeneously miscible with both the cyclopentane or cyclohexane is included, for example, an alkane, cycloalkane having a maximum of 4 carbon atoms, dialkyl ether, cycloalkylene ether, fluoroalkane, hydrofluoroether, or a combination thereof, such is desirably employed in an amount from 0.5 to 3 pbw, and more preferably from 1 to 2 pbw.

In order to produce the foamed polyurethanes of the invention the water and, where selected, physical blowing agent are introduced via known methods into at least one of the formulation components prior to initiation of the final reaction. Introduction into such component may be carried out under pressure if desired. It is also possible to introduce the blowing agent or blowing agent mixture directly into the reaction mixture, expediently by means of a suitable mixing device.

In order to expedite the foam-forming reacting, both a blowing catalyst and a curing catalyst are preferably included in the formulation. While it is known that some catalysts may promote both blowing and curing, such are conventionally differentiated by their tendency to favor either the urea (blow) reaction, in the case of the blowing catalyst, or the urethane (gel) reaction, in the case of the curing catalyst.

Examples of suitable catalysts that may tend to favor the urea reaction may include bis-(2-dimethylaminoethyl)ether; tris(dialkylaminoalkyl)-s-hexahydrotriazines such as 1,3,5-tris (N,N-dimethylaminopropyl)-s-hexahydrotriazine; pentamethyldiethylenetriamine; tetraalkyl-ammonium hydroxides such as tetramethylammonium hydroxide; alkali metal hydroxides such as sodium hydroxide; alkali metal alkoxides such as sodium methoxide and potassium isopropoxide; and alkali metal salts of long chain fatty acids having 10 to 20 carbon atoms and, in some embodiments, pendant hydroxyl groups. In one embodiment, a combination of bis(dimethylaminoethyl)ether and dipropylene glycol may be an effective blowing catalyst, for example in a 70/30 weight percent ratio. Combinations of any of the above may also be selected.

Examples of suitable catalysts that may tend to favor the urethane (gel) reaction include, generally, amidines, tertiary amines, organometallic compounds, and combinations thereof. These may include, but are not limited to, amidines such as 1,8-diazabicyclo-[5.4.0]undec-7-ene and 2,3-dimethyl-3,4,5,6-tetrahydropyrimidine, and tertiary amines such as triethylamine, tributylamine, dimethylbenzylamine, N-methyl-, N-ethyl-, and N-cyclo-hexylmorpholine, N,N,N', N'-tetramethylethylenediamine, N,N,N',N'-tetramethyl-butanediamine and -hexanediamine, pentamethyl-diethylenetriamine, tetramethyldiaminoethyl ether, bis(dimethylaminopropyl)urea, dimethylpiperazine, dimethylcyclohexylamine, 1,2-dimethyl-imidazole, and 1-azabicyclo-[2.2.2]octane. Alkanolamine compounds, such as triethanolamine, triisopropanolamine, N-methyl- and N-ethyldiethanolamine, and dimethyl-ethanolamine may also be selected. Combinations of any of the above may also be effectively employed.

Organometallic compounds may include organotin compounds, such as tin(II) salts of organic carboxylic acids, for example, tin(II) diacetate, tin(II) dioctanoate, tin(II) diethylhexanoate, and tin(II) dilaurate, and dialkyltin(IV) salts of organic carboxylic acids, for example, dibutyltin diacetate, dibutyltin dilaurate, dibutyltin maleate and dioctyltin diacetate. Bismuth salts of organic carboxylic acids may also be selected, such as, for example, bismuth octanoate.

The organometallic compounds may be selected for use alone or in combinations or, in some embodiments, in combination with one or more of the highly basic amines listed hereinabove. In one particular embodiment, the combined amount of the blowing and curing catalysts is greater than 1.4 percent, based on the weight of the polyol formulation.

Another optional additive is a surfactant, or a combination of surfactants. Inclusion of a surfactant in the formulation helps to emulsify the liquid components, regulate cell size, and stabilize the cell structure to prevent collapse and subsurface voids. Suitable surfactants may include, but are not limited to, silicon-based compounds such as silicone oils and organosilicone-polyether copolymers, such as polydimethyl siloxane and polydimethylsiloxane-polyoxyalkylene block copolymers, for example, polyether-modified polydimethylsiloxane. Many surfactant products sold under trade names such as DABCO™ and TEGOSTAB™ may be useful in the inventive formulations.

Additional formulation components may optionally be included, according to the desire of the practitioner. Such may include pigments and colorants; flame retardants; antioxidants; surface modifiers; bioretardant agents; mold release agents; combinations thereof; and the like.

Abrasion modifier additives are often used, particularly in the footwear industry, in order to improve the abrasion resistance of the final polymer. Such additives may include, for example, liquid polybutadiene, such as described in U.S. Pat. No. 5,510,054, which is incorporated herein by reference in its entirety. Other suitable additives for this purpose include organo-modified siloxanes, such as, for example, TEGOSTAB™ B 2114, available from Evonik.

The formulation components may be combined and introduced into a mold or cavity in any way known in the art to produce polyurethane foam. In general, the polyol component is first combined with the water and/or any additional blowing agent(s), any selected blowing or curing catalysts, and any other additives such as surfactant to form a "B" side (in Europe, the "A" side), and this "B" side is then quickly contacted with the "A" side (in Europe, the "B" side), in order to begin the polymerization reaction and foaming. In a more preferred method, a portion of the polyol component is first reacted with an excess of the isocyanate component to form a prepolymer, and the prepolymer is then reacted, as the "A" side (in Europe, the "B" side), with the remaining combined polyol component, water and/or any additional blowing agents, and any other additives, as the "B" side (in Europe, the "A" side), to form the foamed polyurethane. It is noted that in certain applications foaming is carried out under conditions suitable to ensure that the final product is a foam, and in preferred embodiments, a microcellular foam. Those skilled in the art will be aware of various types of apparatus to accomplish the contact while ensuring that an adequate level of mixing occurs to obtain uniformity of the final foam. One way to do this is to use a mixing injection head, wherein the two "sides" of the formulation are combined and mixed and then, more or less simultaneously, injected into the mold or cavity to be filled. The so-called "one shot" injection, wherein the mold or cavity is filled from a single injection point while simultaneously drawing a vacuum from another point, is particularly desirable. The negative pressure of the vacuum maximizes mold- or cavity-filling prior to the formulation's desirably rapid gel time, which in particular embodiments may be less than 25 seconds, and in other embodiments less than 20 seconds. Where a mold is used, demolding may be carried out using standard methodologies, and where desirable, suitable external and/or internal mold release agents may be employed.

EXAMPLES

Table 1 shows target properties for shoe sole applications and references to the test protocols employed to determine properties of Example and Comparative Example samples.

TABLE 1

| PROPERTY | TEST METHOD | TARGET VALUE* |
| --- | --- | --- |
| Hardness, Shore A | DIN 53543 | 45-55 |
| Density, g/L | ISO 845 | 550-650 |
| Slip resistance, COF under dry conditions | ISO 13287 | >0.70 |
| Slip resistance, COF under wet conditions | ISO 13287 | >0.30 |
| Flex fatigue at 23° C., cycles | DIN 53543 | >100,000 |
| Tg, ° C. | DMA, tensile deformation mode, 1 Hz | <−20 |

*for shoe sole applications

Materials used in the following Examples 1-3 and Comparative Examples 1-6 include:

VORANOL CP 6001 is a selection for the first polyether polyol. It is a glycerol initiated polyoxypropylene polyoxethylene triol having a hydroxyl number of 28 and a molecular weight of 6000 g/mol, and is available from The Dow Chemical Company.

VORANOL EP 1900 is a selection for the second polyether polyol. It is a polypropylene-oxyethylene diol (20 wt % EO) having a hydroxyl number of 26-29 and a molecular weight of 3800 g/mol, and is available from The Dow Chemical Company Polyol 1 is SPECFLEX NC 700, a styrene acrylonitrile based copolymer polyol having an average hydroxyl number of 20 and a carrier molecular weight of 4800 g/mol. It has a solids content of 42 wt % in a glycerin-initiated triol as the carrier, and is available from The Dow Chemical Company.

Polyol 2 is a styrene acrylonitrile based copolymer polyol having an average hydroxyl number of 23 and a carrier molecular weight of 3000. It has a solids content of 38 wt % in a diol carrier, and the carrier diol is 20 wt % EO capped.

1,4-butanediol and monoethylene glycol as a blend of chain extenders.

Crosslinkers, used in a limited amount to improve the foam curing, selected from glycerine and diethanolamine (DEOA).

Catalyst Type 1 is a tertiary amine, DABCO™ 33 LB, solved in butanediol and supplied by Air Products.

Catalyst Type 2 is an organo-tin salt, dibutyltin dilaurate, supplied by Air Products as DABCO™ T12N.

Catalyst Type 3 is a strong amine blowing catalyst, NIAX* A-1, diluted in dipropylene glycol and supplied by Momentive.

Silicone surfactant is DC 193 available from Dow Corning.

Abrasion Reducer 1 is liquid polybutadiene.

Abrasion Reducer 2 is an organo-modified siloxane, TEGOSTAB™ B 2114, supplied by Evonik.

ISONATE™ 125M is a mixture of 98 wt % 4,4'-diphenylmethane diisocyanate and 2 wt % 2,4'-diphenylmethane diisocyanate, available from The Dow Chemical Company.

ISONATE™ 143M is a modified diphenylmethane diisocyanate containing polycarbodiimide adducts, available from the Dow Chemical Company.

Dipropylene glycol (DPG) and tripropylene glycol (TPG), as other chain extenders.

VORANOL P 2000 is a propylene oxide based polyol having a molecular weight of 2000 g/mol, hydroxyl number of 56, available from The Dow Chemical Company.

SOLKANE® 134a, a fluoroalkane physical blowing agent, available from Solvay Fluorides LLC.

The first isocyanate component used in preparing the polymer has a free NCO content of 18.4% and contains 65 wt % of monomeric 4,4'-diphenylmethane diisocyanate, dipropylene glycol, and a blend of polyether polyols with an average hydroxyl number of 27.5. The weight ratio of the dipropylene glycol to the blend of long chain polyols is 0.13:1, but it could vary from 0.01:1 to 0.25:1 and would be anticipated to be effective. A suitable composition is listed below as Isocyanate Type A.

A second isocyanate composition used in preparing the polymer has a free NCO content of 18.4% and contains 59.5 wt % of monomeric 4,4'-diphenylmethane diisocyanate, tripropylene glycol, and a polyether polyol with a hydroxyl number of 56. The weight ratio of the tripropylene glycol to the long chain polyol is 0.04:1, but it could vary from 0.01:1 to 0.25:1 and would be anticipated to be effective. A suitable composition is listed below as Isocyanate Type B.

A third isocyanate composition used in preparing the polymer has a free NCO content of 20.8% and contains 73.2 wt % of monomeric 4,4'-diphenylmethane diisocyanate, dipropylene glycol, tripropylene glycol, and a blend of polyether polyols with an average hydroxyl number of 27.5. The weight ratio of the tripropylene glycol to the blend of long chain polyols is 0.18:1, but it could vary from 0.01:1 to 0.25:1 and would be anticipated to be effective. A suitable composition is listed below as Isocyanate Type C.

Examples 1-3 and Comparative Examples A-H

Three isocyanate group-containing prepolymers are prepared. They are designated as "Type A", "Type B" and "Type C" and are prepared using typical prepolymer methodology from the constituents shown in Table 2, as follows. In a suitable steel or glass reactor the required amount(s) of the ISONATE(s) is/are maintained with stirring at 60° C. Benzoyl chloride is added as needed in this step to correct the acidity of the isocyanate. At a controlled rate the mixture of glycols and polyols is then added to the Isocyanate component. The rate of addition is such as to maintain a relatively constant reaction temperature. When the addition of the composition is complete, the resulting reaction mixture is stirred at a temperature of 80° C. for an additional 3 hours to ensure completion of reaction.

TABLE 2

| ISOCYANATE COMPONENT STARTING MATERIALS | TYPE A | TYPE B | TYPE C |
|---|---|---|---|
| ISONATE 125 M, wt % | 65.02 | 59.49 | 73.717 |
| ISONATE 143 M, wt % | — | 2.49 | 2.20 |
| VORANOL EP 1900, wt % | 15.4 | — | 10.40 |
| VORANOL P 2000, wt % | — | 36.54 | — |
| VORANOL CP 6001, wt % | 15.4 | — | 6.02 |
| Dipropylene glycol, wt % | 4.1 | — | 4.75 |
| Tripropylene glycol, wt % | — | 1.47 | 2.90 |
| Benzoyl chloride, wt % | 0.008 | 0.01 | 0.013 |
| NCO content, % | 18.4 | 18.4 | 20.8 |

— indicates not present

Eleven (11) different polyol components are then prepared by mixing at room temperature the constituents shown in Tables 3 and 4, to prepare formulations designated as Examples (Ex.) 1-3 and Comparative Examples (Comp. Ex.) A-H.

TABLE 3

| STARTING MATERIALS | Ex. 1 | Ex. 2 | Ex. 3 | Comp. Ex. A | Comp. Ex. B | Comp. Ex. C | Comp. Ex. D | Comp. Ex. E |
|---|---|---|---|---|---|---|---|---|
| Voranol EP 1900, wt % | 5.62 | 5.62 | 36.68 | 5.62 | 5.00 | 63.1 | 63.18 | 65.00 |
| Voranol CP 6001, wt % | 30.824 | 29.824 | 32.824 | 32.204 | 32.324 | 12.2 | 26.35 | 27.22 |
| Polyol 1, wt % | — | — | — | — | — | 12.0 | 1.5 | — |
| Polyol 2, wt % | 55.0 | 55.0 | 25.2 | 55.0 | 55.0 | — | — | — |
| 1,4-butanediol, wt % | 3.0 | 4.0 | 2.00 | — | 4.0 | 8.25 | 6.44 | 5.0 |
| Monoethylene glycol, wt % | 1.88 | 1.88 | 1.88 | 3.5 | — | — | — | — |
| Catalyst Type 1, wt % | 1.4 | 1.4 | 1.4 | 1.4 | 1.4 | 2.34 | 1.0 | 0.5 |
| Catalyst Type 2, wt % | 0.016 | 0.016 | 0.016 | 0.016 | 0.016 | 0.03 | 0.03 | 0.03 |
| Catalyst Type 3, wt % | 0.16 | 0.16 | — | 0.16 | 0.16 | — | — | — |
| Silicone Surfactant, wt % | — | — | — | — | — | 0.15 | — | — |
| Crosslinker, wt % | — | — | — | — | — | — | 0.2 | 0.2 |
| Abrasion Reducer 1, wt % | — | — | — | — | — | 1.5 | — | 2.0 |
| Abrasion Reducer 2, wt % | — | — | — | — | — | — | 0.3 | — |
| Blowing agent, wt % | 2.0 | 2.0 | — | 2.0 | 2.0 | — | 1.0 | — |
| Water, wt % | 0.1 | 0.1 | 0.05* | 0.1 | 0.1 | 0.43 | — | 0.05* |
| Isocyanate | Type A | Type B | Type A | Type A | Type A | Type A | Type A | Type A |

— indicates not present

*raw materials' water content

TABLE 4

| STARTING MATERIALS | Ex. 1 | Ex. 2 | Ex. 3 | Comp. Ex. F | Comp. Ex. G | Comp. Ex. H |
|---|---|---|---|---|---|---|
| Voranol EP 1900, wt % | 5.62 | 5.62 | 36.68 | 5.62 | 51.390 | 51.39 |
| Voranol CP 6001, wt % | 30.824 | 29.824 | 32.824 | 30.824 | 15.204 | 15.204 |
| Polyol 1, wt % | — | — | — | 55.0 | 18.18 | 18.18 |
| Polyol 2, wt % | 55.0 | 55.0 | 25.2 | — | — | — |
| 1,4-butanediol, wt % | 3.0 | 4.0 | 2.00 | 3.0 | 4.20 | 4.20 |
| Mono-ethylene glycol, wt % | 1.88 | 1.88 | 1.88 | 1.88 | 7.51 | 7.51 |
| Catalyst Type 1, wt % | 1.4 | 1.4 | 1.4 | 1.4 | 1.4 | 1.4 |
| Catalyst Type 2, wt % | 0.016 | 0.016 | 0.016 | 0.016 | 0.016 | 0.016 |
| Catalyst Type 3, wt % | 0.16 | 0.16 | — | 0.16 | — | — |
| Silicone Surfactant, wt % | — | — | — | — | — | — |
| Crosslinker, wt % | — | — | — | — | — | — |
| Abrasion Reducer 1, wt % | — | — | — | — | — | — |
| Abrasion Reducer 2, wt % | — | — | — | — | — | — |
| Blowing agent, wt % | 2.0 | 2.0 | — | 2.0 | 2.0 | 2.0 |
| Water, wt % | 0.1 | 0.1 | 0.05* | 0.1 | 0.1 | 0.1 |
| Isocyanate | Type A | Type B | Type A | Type A | Type A | Type C |

— indicates not present
*raw materials' water content

The formulations are used to prepare microcellular polyurethane foams in the form of test plates (200×200×10 mm for 550-800 g/L density material and 200×200×6 mm for 1100 g/L density material) by reacting them with an Isocyanate component. They are then subjected to testing according to the tests identified in Table 1, in addition to tear (N/mm), tensile strength (N/mm$^2$) and elongation (%), all according to DIN 53543. DMA analyses are done by using a TA Instruments DMA (Dynamic Mechanical Analyzer) Q800 equipped with a liquid nitrogen cooling system (LNCS), in tensile deformation mode. Specimens are prepared by removing a 1.4 to 1.7 mm thick layer from the surface of the original material, then cutting the removed layer to a rectangular geometry of 25×7 mm. Experimental conditions include isothermal temperature, −50° C. for 2 minutes; temperature ramp from −50° C. to 100° C. at 2° C. per minute; frequency, 1 hertz (Hz); preload, 0.01 Newtons (N); strain, 15 micrometers (μm); force track, 125%; gauge distance, about 20 mm; and cooling agent, liquid nitrogen. The testing results are shown in Table 4.

Slip resistance analyses are done according to UNI EN ISO 13287:2006 on a pressed ceramic tile floor under both dry and wet conditions. For testing wet condition performance a detergent solution containing a mass fraction of 0.5% sodium lauryl sulphate (SLS) in demineralized water is employed. For each formulation two (2) circular specimens are cut, each having a 50 mm diameter (total surface area 39 square centimeters (cm$^2$)), with a thickness of 10 mm for the 550-800 g/L density material and 6 mm for the 1100 g/L density material. The normal force is 500 N. The testing results for these analyses are also shown in Table 5 and 6.

TABLE 5

| Property | Ex. 1 | Ex. 2 | Ex. 3 | Comp. Ex. A | Comp. Ex. B | Comp. Ex. C | Comp. Ex. D | Comp. Ex. E |
|---|---|---|---|---|---|---|---|---|
| Hardness (Shore A) | 45 | 47 | 53 | 46 | 45 | 51 | 57 | 55 |
| Density (g/L) | 550 | 550 | 1100 | 550 | 550 | 550 | 800 | 1100 |
| COF, dry | 0.94 | 0.85 | — | 0.71 | 1.02 | 0.62 | 0.83 | — |
| COF, wet | 0.43 | 0.42 | 0.60 | 0.23 | 0.38 | 0.32 | 0.27 | 0.21 |
| Flex Fatigue (23° C.) | >100 kcycles | >100 kcycles | >100 kcycles | >100 kcycles | >100 kcycles | >100 kcycles | >100 kcycles | >100 kcycles |
| Tear (N/mm) | 4.5 | 3.9 | 7.5 | 4.2 | 4.7 | 5.2 | 10.9 | 11.0 |
| Tensile (N/mm$^2$) | 4.5 | 4.4 | 8.5 | 3.5 | 3.5 | 4.7 | 7.4 | 11.5 |
| Elongation (%) | 315 | 300 | 470 | 342 | 293 | 482 | 592 | 500 |
| $T_g$ | −23° C. | −30° C. | −54° C. | −45° C. | −45° C. | −48° C. | −56° C. | — |
| Hand Feeling (subjective) | Pleasant soft touch | Pleasant soft touch | * | Pleasant soft touch | Pleasant soft touch | Dry and plastic touch | Dry and plastic touch | * |

— indicates no test result obtained
* indicates test not applicable due to high density of material

TABLE 6

| Property | Ex. 1 | Ex. 2 | Ex. 3 | Comp. Ex. F | Comp. Ex. G | Comp. Ex. H |
|---|---|---|---|---|---|---|
| Hardness (Shore A) | 45 | 47 | 53 | 51 | 83 | 89 |
| Density (g/L) | 550 | 550 | 1100 | 550 | 640 | 640 |

TABLE 6-continued

| Property | Ex. 1 | Ex. 2 | Ex. 3 | Comp. Ex. F | Comp. Ex. G | Comp. Ex. H |
|---|---|---|---|---|---|---|
| COF, dry | 0.94 | 0.85 | — | 0.57 | 0.28 | 0.27 |
| COF, wet | 0.43 | 0.42 | 0.60 | 0.40 | 0.30 | 0.30 |
| Flex Fatigue (23° C.) | >100 kcycles | >100 kcycles | >100 kcycles | 20 kcycles | <10 kcycles | <10 kcycles |
| Tear (N/mm) | 4.5 | 3.9 | 7.5 | 3.8 | 11.0 | 10.8 |
| Tensile (N/mm²) | 4.5 | 4.4 | 8.5 | 4.9 | 8.0 | 8.4 |
| Elongation (%) | 315 | 300 | 470 | 247 | 310 | 287 |
| $T_g$ | −23° C. | −30° C. | −54° C. | — | — | — |
| Hand Feeling (subjective) | Pleasant soft touch | Pleasant soft touch | * | Pleasant soft touch | Very dry and plastic touch, similar to wood | Very dry and plastic touch, similar to wood |

— indicates no test result obtained
* indicates test not applicable due to high density of material The results in Tables 5 and 6 show that formulations containing 1,4-butanediol or monoethylene glycol as a sole chain extender (Comparative Examples A and B), of closely similar hardness and similar overall formulations, have generally lower COFs under wet conditions (0.23 and 0.34, respectively) than the inventive formulations (Examples 1 and 2, 0.43 and 0.42, respectively). Examples 1 and 2 also show better slip resistance performance than some other, more traditional polyether-based polyurethane systems (Comparative Examples C and D, 0.32 and 0.27, respectively). Similar results are seen for a higher density material (Example 3, 0.60) when compared with a more traditional polyether-based polyurethane system (Comparative Example E, 0.21). Comparative Example F shows that performance is reduced when the carrier is a triol (Polyol 1) rather than when it is a diol (Polyol 2). In fact, the triol-carrier copolymer polyol also shows a dramatic decrease in flex fatigue performance. Comparative Examples G and H further illustrate certain polyol formulations, made using copolymer polyols having triol carriers, in comparison with the inventive foams.

The invention claimed is:

1. A foamed polyurethane prepared by combining
(1) a polyol component including at least
(a) from 1 to 40 wt %, based on the polyol component, of a first polyether polyol, having a hydroxyl value from 25 to 30, a nominal functionality of 3, and a molecular weight of from 5000 to 7000 g/mol; the first polyether polyol being prepared from propylene oxide and capped with ethylene oxide, having from 70 to 90 wt % primary hydroxyl groups;
(b) from 5 to 60 wt %, based on the polyol component, of a second polyether polyol, having a hydroxyl value of from 25 to 30, a nominal functionality of 2, and a molecular weight of from 3000 to less than 5000 g/mol; the second polyether polyol being prepared from propylene oxide and capped with ethylene oxide and having from 80 to 98 wt % primary hydroxyl groups;
(c) from 2 to 11 wt %, based on the polyol component, of a chain extender mixture including from 1.2 to 10.2 wt %, based on the polyol component, of 1,4-butanediol, and from 0.8 to 9.8 wt %, based on the polyol component, of at least one of monoethylene glycol and hexanediol;
(d) from 20 to 60 wt %, based on the polyol component, of a copolymer polyether polyol having a styrene acrylonitrile solids content of at least 38 wt % and an average hydroxyl number of at least 23;
(e) a branched diol or triol having a molecular weight from 60 to 300 g/mol; and
(f) a polyoxyalkylene polyol, different than components (a) and (b), having an average functionality from 2 to 4 and a molecular weight of from 2000 to 9000 g/mol;
wherein (e) and (f) are present in a parts by weight ratio of from 0.01:1 to 0.25:1;
(2) an isocyanate component; and
(3) a blowing agent.

2. A foamed polyurethane prepared by combining
(1) a polyol component including at least
(a) from 20 to 35 wt %, based on the polyol component, of a first polyether polyol, having a hydroxyl value from 25 to 30, a nominal functionality of 3, and a molecular weight of from 5000 to 7000 g/mol; the first polyether polyol being prepared from propylene oxide and capped with ethylene oxide, having from 70 to 90 wt % primary hydroxyl groups;
(b) from 5 to 40 wt %, based on the polyol component, of a second polyether polyol, having a hydroxyl value of from 25 to 30, a nominal functionality of 2, and a molecular weight of from 3000 to less than 5000 g/mol; the second polyether polyol being prepared from propylene oxide and capped with ethylene oxide and having from 80 to 98 wt % primary hydroxyl groups;
(c) based on the polyol component, a chain extender mixture consisting essentially of from 2 to 5 wt %, based on the polyol component, of 1,4-butanediol, and from 1 to 2 wt %, based on the polyol component, of monoethylene glycol;
(d) from 20 to 55 wt %, based on the polyol component, of a copolymer polyether polyol that includes a diol carrier, has a styrene acrylonitrile solids content of at least 38 wt % and has an average hydroxyl number of at least 23;
(2) an isocyanate component; and
(3) a blowing agent.

3. The foamed polyurethane according to claim 2 wherein the isocyanate component has an isocyanate equivalent weight of from 180 to 300 and comprises a prepolymer prepared by reacting a monomeric 4,4' diphenyl methane-diisocyanate and an isocyanate-reactive material.

4. The foamed polyurethane according to claim 2 wherein the blowing agent includes water.

5. The foamed polyurethane according to claim 4 wherein the blowing agent includes a physical blowing agent selected from the group consisting of alkanes; cycloalkanes; dialkyl ethers; cycloalkane ethers; fluoroalkanes; hydrofluoroethers; and mixtures thereof.

6. The foamed polyurethane according to claim 5 having a density from 350 to 1200 grams per liter.

7. The foamed polyurethane according to claim 6 having a Shore A hardness not greater than 60 and a flex fatigue resistance at 23° C. of greater than 100 kilocycles.

8. The foamed polyurethane according to claim 7 having a coefficient of friction of greater than 0.70 under dry conditions and greater than 0.30 under wet conditions, as measured according to UNI EN ISO 13287:2006.

9. A process for preparing a foamed polyurethane comprising reacting under foam-forming conditions
  (1) a polyol component including
    (a) from 20 to 35 wt %, based on the polyol component, of a first polyether polyol, having a hydroxyl value from 25 to 30, a nominal functionality of 3, and a molecular weight of from 5000 to 7000 g/mol; the first polyether polyol being prepared from propylene oxide and capped with ethylene oxide, having from 70 to 90 wt % primary hydroxyl groups;
    (b) from 5 to 40 wt %, based on the polyol component, of a second polyether polyol, having a hydroxyl value of from 25 to 30, a nominal functionality of 2, and a molecular weight of from 3000 to less than 5000 g/mol; the second polyether polyol being prepared from propylene oxide and capped with ethylene oxide and having from 80 to 98 wt % primary hydroxyl groups;
    (c) a chain extender mixture consisting essentially of from 2 to 5 wt %, based on the polyol component, of butanediol, and from 1 to 2 wt %, based on the polyol component, of monoethylene glycol;
    (d) from 25 to 55 wt %, based on the polyol component, of a copolymer polyether polyol that includes a diol carrier, has a styrene acrylonitrile solids content of at least 38 wt % and has an average hydroxyl number of at least 23;
  (2) an isocyanate component; and
  (3) a blowing agent;
  to form a foamed polyurethane.

10. A polyol component suitable for use in preparing a foamed polyurethane, comprising
  (a) from 20 to 35 wt %, based on the polyol component, of a first polyether polyol, having a hydroxyl value from 25 to 30, a nominal functionality of 3, and a molecular weight of from 5000 to 7000 g/mol; the first polyether polyol being prepared from propylene oxide and capped with ethylene oxide, having from 70 to 90 wt % primary hydroxyl groups;
  (b) from 5 to 40 wt %, based on the polyol component, of a second polyether polyol, having a hydroxyl value of from 25 to 30, a nominal functionality of 2, and a molecular weight of from 3000 to less than 5000 g/mol; the second polyether polyol being prepared from propylene oxide and capped with ethylene oxide and having from 80 to 98 wt % primary hydroxyl groups;
  (c) a chain extender mixture consisting essentially of from 2 to 5 wt %, based on the polyol component, of butanediol and from 1 to 2 wt %, based on the polyol component, of monoethylene glycol; and
  (d) from 20 to 55 wt %, based on the polyol component, of a copolymer polyether polyol that includes a diol carrier, has a styrene acrylonitrile solids content of at least 38 wt % and has an average hydroxyl number of at least 23.

* * * * *